Jan. 25, 1949.　　　H. E. CHURCHILL　　　2,459,793
TRANSMISSION
Filed Aug. 9, 1946　　　　　　　　　　　　3 Sheets-Sheet 1

INVENTOR.
Harold E. Churchill
BY
Brown Jackson Boucher Denner
ATTORNEYS.

Jan. 25, 1949. H. E. CHURCHILL 2,459,793
TRANSMISSION
Filed Aug. 9, 1946 3 Sheets-Sheet 2

INVENTOR.
Harold E. Churchill
BY
Brown, Jackson, Boettcher & Dienner.
ATTORNEYS.

INVENTOR.
Harold E. Churchill

Patented Jan. 25, 1949

2,459,793

UNITED STATES PATENT OFFICE 2,459,793

TRANSMISSION

Harold E. Churchill, South Bend, Ind., assignor to The Studebaker Corporation, South Bend, Ind., a corporation of Delaware Application August 9, 1946, Serial No. 689,602

17 Claims. (Cl. 74—269)

My present invention relates to an improvement in transmissions, and more particularly to transmissions of the planetary or epicyclic gear type providing a plurality of gear ratios for forward and reverse drive.

Planetary gear mechanisms have come into use in constructing automatic or semi-automatic transmissions for automotive vehicles largely because of the ease with which they may be controlled to effect changes in gear ratio. These automatic or semi-automatic transmissions usually comprise a fluid torque converter unit which, as is known, provides infinitely variable torque multiplication automatically, and which when used in conjunction with a planetary gear mechanism provides a form of transmission particularly adaptable for use in obtaining desired forward gear ratios for an automotive vehicle. In such types of transmissions it has been proposed to provide a second planetary or epicyclic gear mechanism which is adapted to be actuated to provide for reverse drive. For example, a pair of planetary gear mechanisms may be arranged so that one of the planetary gear mechanisms provides either ratio or direct forward drive therethrough, when the second of the planetary gear mechanisms is locked-up, and which latter planetary gear mechanism when one of the elements thereof is caused to be held against rotation is adapted to effect a reverse drive.

In the copending application of myself, Paul V. Haigh and Harold O. Zander, Serial No. 644,828, filed February 1, 1946, there is disclosed a transmission of the type last referred to. In the transmission of that application a planetary gear mechanism is provided for effecting reverse drive and which has associated therewith positive jaw clutch and brake means for clutching two of the elements together for conjoint rotation for forward drive through the transmission, or for braking one of the elements of the planetary gear mechanism to effect reverse drive therethrough. However, it has been found that the selective actuation of a planetary gear mechanism as by positive jaw clutch and brake means associated with a planetary gear mechanism to effect forward or reverse drive therethrough is not entirely satisfactory in that it is difficult to effect the synchronous engagement and disengagement of the positive jaw clutch and brake teeth in the operation of an automotive vehicle.

In the copending application of Woodrow A. Hasbany, Serial No. 678,449 filed June 21, 1946, the above noted disadvantage has been overcome by providing a transmission comprising an arrangement of a pair of planetary gear mechanisms each having three elements, namely, a sun gear, single planet pinion means, and a ring gear in which two of the elements of each of the planetary gear mechanisms are connected together. A pair of friction brake means and a friction clutch means each of which are operable independently of the other are arranged with respect to the planetary gear mechanisms to provide for the selective actuation of the transmission to provide either ratio or direct forward drive or ratio reverse drive. In the specific embodiment of the invention disclosed in the application last referred to, the ring gear of one planetary gear mechanism and the sun gear of the other planetary gear mechanism are formed as a common member, and the planet pinion means of the one planetary gear mechanism and the ring gear of the other planetary gear mechanism are connected together. In this arrangement of parts a clutch means of the friction disc type is associated with one of the sun gears of one of the planetary gear mechanisms and another of the elements thereof, and which clutch means is operable to clutch the two elements together for conjoint rotation to provide a direct drive through the transmission. This arrangement of the clutch means with the planetary gear mechanisms is of disadvantage in that it only permits of association of the clutch means with a sun gear and in view of the relatively high rate of rotation of the sun gear and planet pinion means under certain circumstances results in objectionable humming of the disc clutch plates, and further at high speeds of rotation causes rapid wearing away of the disc clutch plates.

It is an object of my present invention to provide a transmission comprising a first planetary gear mechanism having single planet pinion means and a second planetary gear mechanism having dual planet pinion means which are arranged with respect to each other and together with friction brake and clutch means associated therewith to provide for the selective actuation of the transmission to effect a plurality of forward drive ratios and reverse drive between drive and driven shafts of the transmission.

A further object of my invention is to provide a transmission as aforesaid in which the ring gear of the first planetary gear mechanism is formed as an integral member with the sun gear of the second planetary gear mechanism and in which the planet pinion means of both of the planetary gear mechanisms are connected together, and which together with the friction brake and clutch means provides a transmission operable for effecting selected forward drive ratios and reverse drive.

I propose to achieve the aforesaid objects by providing a transmission comprising a first planetary gear mechanism having three elements, namely, a first sun gear, first single planet pinion means, and a first ring gear, and a second planetary gear mechanism having three elements, namely, a second sun gear, second dual planet pinion means and a second ring gear. In the preferred embodiment of my invention herein disclosed the drive shaft for the transmission has driving connection with the first ring gear and the driven shaft has connection with the planet arm or carrier of the connected planet pinion means of the planetary gear mechanisms. Preferably the arrangement is such that the first ring gear and the second sun gear are formed in a common member extending between the pair of planetary gear mechanisms. In such a relation of parts I propose to provide a first friction brake means selectively operable for holding the first sun gear against rotation for effecting low ratio drive through the transmission through the first planetary gear mechanism. The transmission further embodies a friction clutch means preferably of the friction disk type arranged between at least two of the elements of one of the planetary gear mechanisms so that when this clutch means is actuated with the first brake means referred to being released direct drive in the forward direction is adapted to be transmitted from the drive shaft to the driven shaft. The transmission further comprises a second brake means associated with the ring gear of the second planetary gear mechanism which second brake means is selectively operable for holding the second ring gear against rotation and with the first brake means and the clutch means disengaged effects reverse drive between the drive shaft and driven shaft of the transmission.

The structure above referred to permits, as disclosed hereinafter in detail in connection with the preferred embodiment of my invention, the arrangement of the friction clutch means between the connected planet pinion means of both of the planetary gear mechanisms and the ring gear of the first planetary gear mechanism in view of which the rotational speed of the friction disk plates is not great so that this clutch means will have a relatively long life. In addition the relatively slow rate of rotation of the friction disk provides for increased efficiency and eliminates any objectionable humming thereof in the operation of the transmission with this form of the invention having particular adaptability for automotive use.

A further preferred feature of certain of the embodiments of my invention hereinafter disclosed in detail resides in the arrangement of the pair of planetary gear mechanisms in juxtaposition of each other coaxially of a common axis of the drive and driven shafts, and in which the friction clutch means is disposed adjacent one of the planetary gear mechanisms.

A further preferred feature of another embodiment of my invention resides in an arrangement wherein the first and second planetary gear mechanisms are disposed coaxially of a common axis of the drive and driven shafts, and wherein the planetary gear mechanisms are spaced lengthwise axially of the common axis of the drive and driven shafts with the friction clutch means being adapted to be disposed therebetween.

A further preferred feature of certain embodiments of my invention resides in an arrangement of a pair of planetary gear mechanisms in which the friction clutch means may be disposed anterior or posterior of either thereof to provide considerable flexibility in the adaptation of the transmission in an automotive vehicle.

The above and other objects and advantages of my invention will appear from the detail description.

Now, in order to acquaint those skilled in the art with the manner of constructing and utilizing transmissions in accordance with my present invention, I shall describe in connection with the accompanying drawings certain preferred embodiments of my invention.

Figure 1:
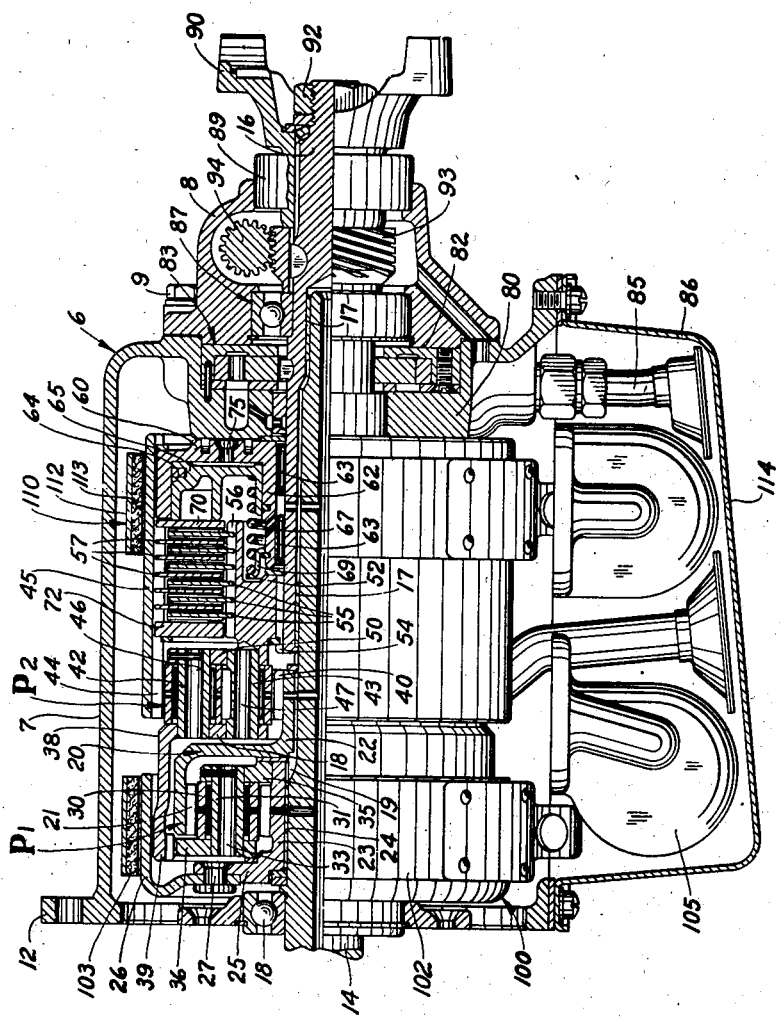
Figure 1 is a detail vertical sectional view of the preferred embodiment of a transmission constructed in accordance with my invention, with certain of the parts of the transmission being shown in elevation.

Referring now to Figure 1 I have shown a transmission 6 comprising a transmission housing section 7 and a speedometer housing section 8 in which the latter is secured to the outer end of the housing section 7 by a plurality of bolts one of which is shown at 9. The inner end of the housing section 7 is provided with a radially outwardly extending flange 12 adapted to be bolted to the housing of a fluid torque converting unit (not shown) in a manner well known in the art. A drive shaft 14 extends inwardly of the inner end of housing section 7 and may, for example, have connection with the rotor or driven element of a conventional fluid torque converting unit, which unit as is known is adapted to have the impeller or turbine element thereof connected with the crank shaft of a prime mover such as an internal combustion engine and through which the drive shaft 14 is caused to be driven by the prime mover. The drive shaft 14, as shown, is piloted in a bore extending inwardly of the inner end of the driven shaft 16 and a pair of bearing sleeves 17 are disposed between the drive and driven shafts and which together with the ball bearing assembly 18 adjacent the inner end of the housing section 7 provides for the support of the drive shaft 14. The drive shaft 14 is provided with an intermediate splined portion 19 to which a member 20 formed with an internal ring gear 21 of a first planetary gear mechanism P1 is provided with a sleeve portion 22 having external gear teeth forming a sun gear 40 of a second planetary gear mechanism P2, and which sleeve portion is formed with internal splines having splined engagement with the splines 19 of the drive shaft so that the member 20 is caused to be driven by the drive shaft 14.

The planetary gear mechanism P1 further comprises a sun gear element or member 23 which is mounted for rotation on the drive shaft by means of a bearing bushing 24 disposed therebetween. The sun gear 23 is provided with an annular radially outwardly extending flange portion 25 to which a brake drum member 26 is secured, as by a plurality of rivets one of which is shown at 27. The planetary gear mechanism P1 further comprises single planet pinion means 30 comprising a plurality of planet pinions 31 (one of which is shown in the drawing) having meshing engagement with the internal ring gear 21 of member 20 and the sun gear member or element 23 with each of the planet pinions 31 being rotatably supported on a planet pin 33 suitably secured at opposite ends in a planet pinion carrier means comprising an end plate 35 and a plate member 36 disposed adjacent opposite ends of the planet pinions 31. The plate member 36, as shown, is formed with a plurality of teeth having constant engagement with the internal teeth of a substantially cup-shaped member 38 forming in part the planet pinion carrier means for the planetary gear mechanisms P1 and P2. The annular flange portion 39 of the cup-shaped member 38, as shown, extends coaxially of the ring gear 21 and is disposed therebetween and the brake drum 26 providing for a convenient nesting relation of these parts. As previously related the member 20 in addition to being formed with the internal ring gear 21 for the planetary gear mechanism P1 also forms a sun gear 40 for the second planetary gear mechanism P2. The planetary gear mechanism P2 further comprises a plurality of dual planet pinions 42 and 43 with the planet pinions 42 having meshing engagement with ring gear teeth 44 formed internally and extending lengthwise of a brake drum member 45, and with the planet pinions 43 having meshing engagement with the planet pinions 42 and the sun gear 40. The planet pinions 42 and 43 are each mounted for rotation about pins 46 and 47, respectively, which pins 46 and 47, respectively, are secured at their inner ends in the radially inwardly extending flange 48 of the carrier member 38 and at their other ends in an end carrier member 50. The member 50 is formed with an integral sleeve portion 52 and as shown has splined connection as at 54 with the inner splined end of the driven shaft 16. A plurality of friction disk plates 55 have splined connection with the external splines 56 of the sleeve portion 52 and a plurality of second friction clutch disk members 57 have connection with the internal gear teeth of the drum member 45 forming in part the ring gear for the second planetary gear mechanism P2. The outer end of the drum portion 45 is closed by a transversely extending cylinder forming member 60 which is provided with a hub portion 62 rotatably mounted about the driven shaft 16 by a plurality of pin bearing means 63 disposed therebetween. The member 60 has formed therein an inwardly extending annular cylinder 64 in which an annular piston 65 is disposed. A coil spring 67 is disposed between the piston 65 and a spring seat member 69 fixed to the inner end of a sleeve portion 62 of the end member 60 for normally biasing the piston 65 to the position shown in the drawings. An annular clutch plate 70 is disposed adjacent the inner end of the piston 65 and an end clutch plate member 72 is connected to the drum member 45 for rotation therewith and between which plate members 70 and 72 the plurality of friction clutch disks 55 and 57 are disposed. The member 60 is provided with a port 75 through which fluid under pressure is adapted to be admitted into the cylinder 64 and which fluid under pressure is effective to cause movement of the piston 65 to the left as viewed in Figure 1 to engage the several friction disks 55 and 57 to clutch the planet carrier means of the planetary gear mechanisms with the ring gear of planetary gear mechanism P2 and in this manner lock up the latter. It will be understood that the port has suitable connection with a source of fluid under pressure to effect actuation of the clutch in the manner last referred to. The outer end of housing section 7 is further formed with an inwardly extending hub portion 80 and which together with the inner end of the speedometer housing section 8 provides a pump chamber 82 in which the rotor pump, shown generally at 83, is disposed and which has connection with the driven shaft 16 for effecting delivery of fluid to a control means (not shown) for the transmission. The inlet side of the pump 83 has connection with the pipe 85 extending downwardly into the sheet metal pan 86 which is suitably secured to the lower end of the transmission housing section 7 and through which pipe 85 fluid under pressure collected in the pan 86 is withdrawn and returned to the transmission control means. Any suitable control means may be provided for effecting the control of the present transmission with one such suitable form of control means for the transmission of my present invention being shown and described in the co-pending application of Woodrow A. Hasbany, Serial No. 678,449 filed June 21, 1946.

The driven shaft 16 as shown is mounted in a conventional manner in a ball bearing race 87 supported within the speedometer housing section 8 and an oil seal 89 of known construction is disposed adjacent the outer end of the speedometer housing section 8 and through which the driven shaft 16 extends with the driven shaft 16 having a conventional form of propeller shaft connecting member 90 secured thereto as by the nut 92 having threading engagement with the threaded outer end of the driven shaft 16. The driven shaft further has a conventional form of worm 93 keyed thereto having meshing engagement with the worm wheel 94 providing a speedometer connection for a vehicle with which the transmission may be associated.

The brake drum member 26 associated with the first planetary gear mechanism P1 forms in part a friction brake means shown at 100, and which brake means includes a brake band member 102 carrying an annular band 103 of suitable friction material adapted to be brought into engagement with the outer surface of the brake drum member 26 to hold the sun gear 23 of the planetary gear mechanism P1 against rotation. A cylinder 105 is disposed in the sheet metal pan 86 of the transmission and it is provided with means (not shown) for effecting contraction of the brake band member 102 to effect braking engagement of the brake member 26 by admission of fluid under pressure into the cylinder 105 and through movement of a piston therein. Further reference may be had to the last referred to application of Woodrow A. Hasbany, Serial No. 678,449, filed June 21, 1946, for a description of control means for effecting admission of fluid into a cylinder such as that shown at 105 for effecting actuation of the brake means 100. It will be understood that any suitable means may be provided for controlling actuation of the brake means 100, and that such control means per se forms no part of my present invention.

Also, as previously related the member 45 forms a brake drum for a second brake means shown at 110 and which brake means 110 further comprises a brake band member 112 carrying an annular member 113 of friction material adapted to be brought into frictional engagement with the member 45 to restrain the latter against rotation. A second cylinder shown generally at 114 and having a piston movable therein by fluid under pressure admitted into the cylinder is provided for effecting actuation of the brake means 110. As before any suitable means may be provided for effecting actuation of the brake means 110 and with respect of which reference may be had to the last referred to application of Woodrow A. Hasbany, Serial No. 678,449, filed June 21, 1946.

Figure 2:
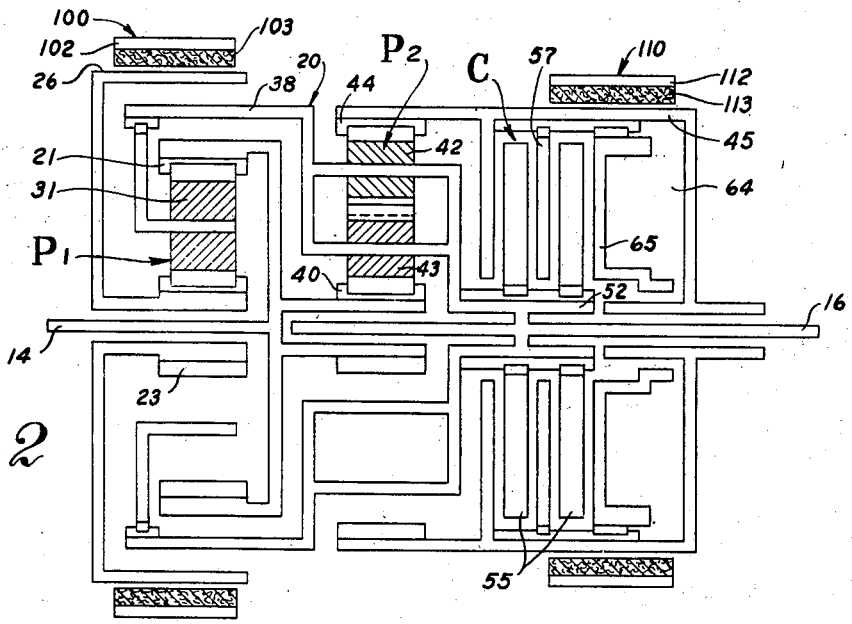
Figure 2 is a diagrammatic illustration of the essential parts and arrangement thereof of the transmission shown in Figure 1.

Reference may now be had to Figure 2 which illustrates diagrammatically the transmission described in detail in connection with Figure 1, and in connection with the latter figure I shall now describe the mode of operation of the embodiment of my invention first above described:

In Figure 2 the clutch means C and the pair of brake means 100 and 110 are disengaged and under the latter condition the drive line between the drive shaft 14 and the driven shaft 16 is broken providing a neutral for the transmission. Now upon actuation of the brake means 100 the sun gear 23 of the first planetary gear mechanism $P_1$ will be held against rotation providing drive from the ring gear 21 through the planet pinions 31 to the connected planet pinion carriers of the planetary gear mechanisms $P_1$ and $P_2$, and which through the splined connection of the sleeve portion 52 of the carrier means of planetary gear mechanism $P_2$ with the driven shaft 16 effecting ratio drive in the forward direction to the driven shaft. The second forward drive ratio is adapted to be effected by disengaging the brake means 100 and engaging the friction clutch means C as by admission of fluid under pressure into cylinder 64 to effect movement of the piston 65 to the left, as viewed in the drawing, and which upon engagement of the friction disks 55 and 57 effects clutching of the ring gear element 44 of the planetary gear mechanism $P_2$ with the connected planet pinion carrier means thus effecting locking up of two of the elements of planetary gear mechanism $P_2$ so that a direct drive in the forward direction is adapted to be transmitted from the drive shaft 14 to the driven shaft 16. It will be observed that in the ring gear 21 of the planetary gear mechanism $P_2$, is formed integral with the sun gear 40 of the second planetary gear mechanism $P_2$ and that the planet carrier members of each of the planetary gear mechanisms are connected together that under the latter condition the first planetary gear mechanism $P_1$ simply rotates as a fly wheel.

Now in order to effect reverse drive from the drive shaft 14 to the driven shaft 16 the clutch means C and the brake means 100 are both disengaged, and the brake means 110 is caused to be actuated to hold the drum member 45 and with it the integral ring gear 44 of the planetary gear mechanism $P_2$ against rotation. With the brake 110 applied it will be observed that the drive shaft 14 since it has connection with the common member 20 forming the ring gear of the first planetary gear mechanism $P_1$ and the sun gear 40 of the second planetary gear mechanism $P_2$ effects through the dual planet pinions 42 and 43 reverse rotation of the planet pinion carrier means and which by virtue of its splined connection with the driven shaft 16 effects reverse ratio drive of the driven shaft.

It will be observed from the above that the three means comprising the brake means 100, the brake means 110 and the clutch means C are adapted to be actuated individually with respect to each other and in which the actuation of one of each of these three means provides for one of two forward drive ratios and reverse drive ratio between the drive and driven shafts of the transmission.

Figure 3:
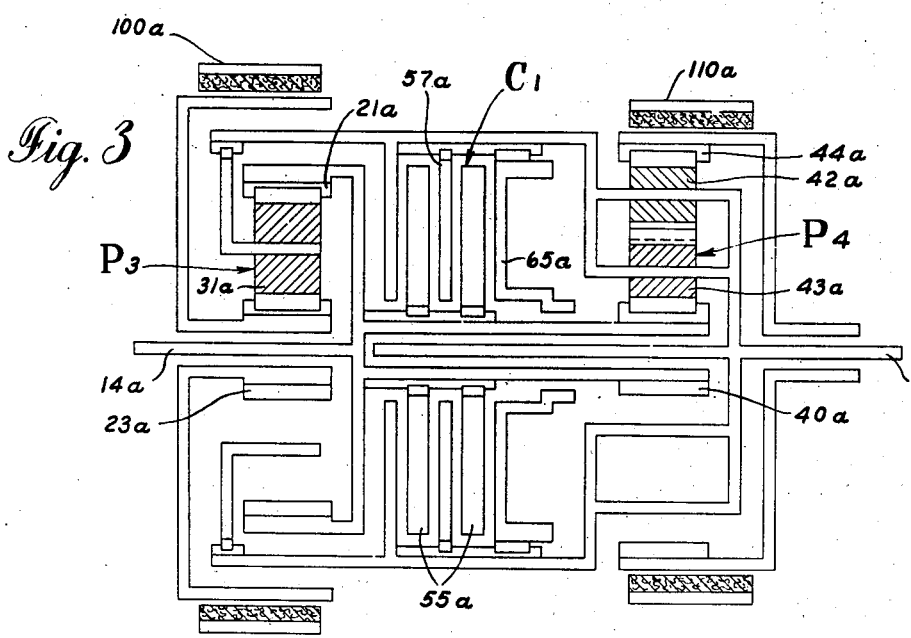
Figure 3 is a diagrammatic view of a transmission along the lines of the transmissions of Figures 1 and 2, but illustrating an arrangement of parts wherein the planetary gear mechanisms may be spaced lengthwise axially of a common axis of the drive and driven shafts to provide for the disposing therebetween of a clutch means operable for effecting direct drive through the transmission.

Referring now to Figure 3 I have shown a modified form of transmission constructed in accordance with my invention in which a first planetary gear mechanism $P_3$ having single planet pinions 31a, and a second planetary gear mechanism $P_4$ having dual planet pinions 42a and 43a are arranged axially of the common axis of the coaxially disposed drive shaft 14a and driven shaft 16a. In this embodiment of my invention the clutch means $C_1$ is disposed between the axially lengthwise spaced planetary gear mechanism $P_3$ and $P_4$. However, in this form of the invention the clutch means $C_1$ comprises a plurality of friction disks 57a having connection with the connected common planet carrier means for the planet pinions of each of the planetary gear mechanisms and with the friction disks 55a being associated with the ring gear 21a of the planetary gear mechanism $P_3$ and sun gear 40a of planetary gear mechanism $P_4$. Briefly the transmission of Figure 3 operates in the following manner: Upon actuation of the brake means 100a the sun gear 23a of the planetary gear mechansm $P_3$ is held against rotation so that ratio drive in the forward direction is provided between the connected planet pinion carrier means of the pair of planetary gear mechanisms and the driven shaft 16a. Upon release of the brake means 100a and engagement of the friction disk clutch means $C_1$, it will be observed that the connected planet carriers of the pair of planetary gear mechanisms are caused to be clutched to the ring and sun gears of the planetary gear mechanisms $P_3$ and $P_4$, respectively, providing for forward direct drive from the drive shaft 14a to the driven shaft 16a. Now upon disengagement of the brake means 100a and the clutch means $C_1$ and engagement of the brake means 110a the ring gear 44a of planetary gear mechanism $P_4$ is held against rotation whereupon the driven shaft 16a is caused to be driven in a direction opposite the direction of rotation of the drive shaft 14a through the dual planet pinions 42a and 43a.

Figure 4:
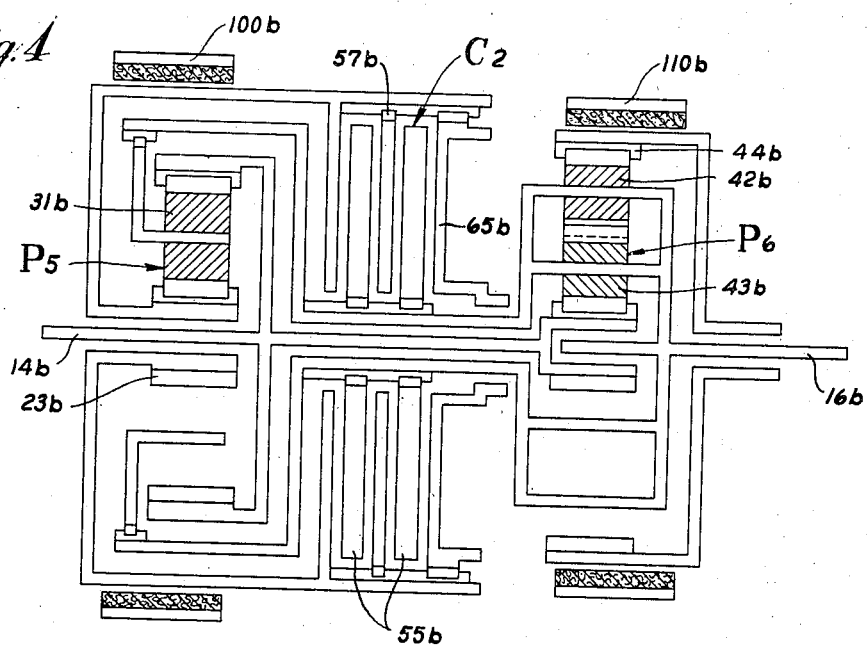
Figure 4 is a diagrammatic view of another embodiment of a transmission constructed in accordance with my present invention.

Referring now to Figure 4 I have shown still another embodiment of a transmission constructed in accordance with my invention in which the clutch means $C_2$ is arranged with the friction disks 57b thereof having connection with the sun gear member 23b of planetary gear mechanism $P_5$ and with the friction disks 55b having connection with the connected planet carriers of the pair of planetary gear mechanism $P_5$ and $P_6$. The planetary gear mechanism $P_5$ has the single planet pinions 31b, and the planetary gear mechanism P₆ has the dual planet pinion 42b and 43b. As before actuation of the brake means 100b effects forward ratio drive from the drive to driven shafts 14b and 16b, respectively. Actuation of the clutch means C₂ effects clutching of the connected planet carriers of the planetary gear mechanisms P₅ and P₆ with the sun gear 23b of planetary gear mechanism P₅ to provide for direct drive in the forward direction from the drive to driven shafts. Disengagement of the brake means 100b and the clutch means C₂ and engagement of the brake means 110b effects braking of the ring gear 44b of planetary gear mechanism P₆ against rotation to effect reserve ratio drive from the drive shaft 14b to the driven shaft 16b. As before, the clutch means C₂ is disposed between the coaxially spaced planetary gear mechanisms P₅ and P₆.

Figure 5:
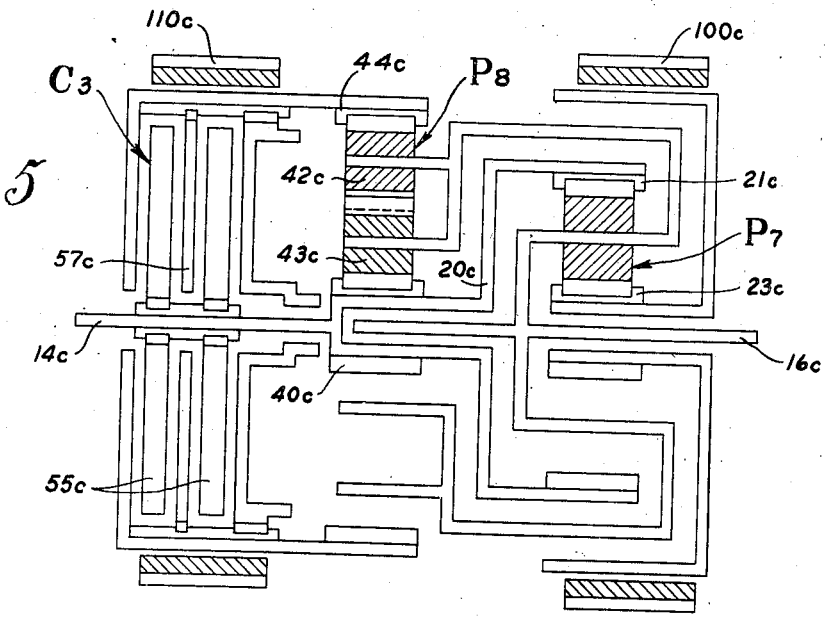
Figure 5 is a diagrammatic view of still another form of transmission constructed in accordance with my present invention.

Referring now to Figure 5, I have shown still another embodiment of a transmission constructed in accordance with my invention in which the clutch means C₃ is disposed adjacent the inner end of the transmission and in which the single planet pinion planetary gear mechanism P₇ is disposed posterior of the dual planet pinion planetary gear mechanism P₈. In this embodiment of my invention the friction disks 57c have connection with the ring gear member 44c of planetary gear mechanism P₈ and the friction disks 55c have connection with the drive shaft 14c, which as before has connection with the integral member 20c forming the sun gear 40c of planetary gear mechanism P₈ and the ring gear 21c of the planetary gear mechanism P₇. The driven shaft 16c has connection with the connected planet carrier means of the planet pinions for the pair of planetary gear mechanisms. Actuation of the brake means 100c is effective to hold the sun gear 23c of planetary gear mechanism P₇ against rotation to provide a forward ratio drive from the drive shaft 14c to the driven shaft 16c. Upon disengagement of the brake means 100c and engagement of the clutch means C₃ the sun gear 40c and ring gear 21c are caused to be clutched to the ring gear 44c of planetary gear mechanism P₈ providing direct drive from the drive shaft 14c to the driven shaft 16c. Upon disengagement of the brake means 100c and the clutch means C₃ and engagement of brake means 110c, the ring gear 44c of planetary gear mechanism P₈ is held against rotation and which is effective to provide reverse ratio drive through the dual planet pinions 42c and 43c of planetary gear mechanisms P₈ and the connected planet pinion carriers of the pair of planetary gear mechanisms from the drive shaft 14c to the driven shaft 16c.

It will be observed that in the several embodiments of my invention above described that the following common features are present in each:

(1) A common member such as the members 20, 20a, 20b and 20b, is arranged to provide a ring gear element and a sun gear element of a pair of planetary gear mechanisms.

(2) The planet pinion carrier means or arms of both planetary gear mechanisms are connected together.

(3) That the drive shaft has connection with the common member forming the ring and sun gear elements of the pair of planetary gear mechanisms; and (4) That the driven shaft of the transmission has connection with the planet pinion carrier means or arms of the planetary gear mechanisms.

While I have shown what I consider to be the preferred embodiments of my invention it will be understood that various modifications and rearrangements may be made therein without departing from the spirit and scope of my invention.

I claim:

1. A transmission comprising a first planetary gear mechanism having three first elements, namely, a first sun gear, first single planet pinion means, and a first ring gear, a second planetary gear mechanism having three second elements, namely, a second sun gear, a second dual planet pinion means and a second ring gear, one of said first elements being connected to one of said second elements, a second of said first elements being connected to a second of said second elements, brake means associated with the third of the elements of one of said planetary gear mechanisms, and second brake means associated with the third of the elements of the other of said planetary gear mechanisms.

2. A transmission comprising a first planetary gear mechanism having three first elements, namely, a first sun gear, a first single planet pinion means, and a first ring gear, a second planetary gear mechanism having three second elements, namely, a second sun gear, a second dual planet pinion means, and a second ring gear, one of said first elements having connection with one of said second elements, a second of said first elements having connection with a second of said second elements, clutch means between one pair of the connected elements of said planetary gear mechanisms and another element of one of said planetary gear mechanisms, first brake means associated with the third of the elements of said one planetary gear mechanism, and second brake means associated with the third of the elements of the other planetary gear mechanism.

3. A transmission comprising a first planetary gear mechanism having a first sun gear, first planet pinion means, and a first ring gear, a second planetary gear mechanism having a second sun gear, second dual planet pinion means, and a second ring gear, said first and second planet pinion means being connected together, said first ring gear and said second sun gear being connected together, and brake means associated with said first sun gear.

4. A transmission comprising a first planetary gear mechanism having a first sun gear, first planet pinion means, and a first ring gear, a second planetary gear mechanism having a second sun gear, second dual planet pinion means, and a second ring gear, said first and second planet pinion means being connected together, said first ring gear and said second sun gear being connected together, brake means associated with said first sun gear, and brake means associated with said second ring gear.

5. A transmission comprising a first planetary gear mechanism having three first elements, namely, a first sun gear, first single planet pinion means, and a first ring gear, a second planetary gear mechanism having three second elements, namely, a second sun gear, a second dual planet pinion means and a second ring gear, said first and second planet pinion means being connected together, said first ring gear and said second sun gear being connected together, first brake means associated with said first sun gear, second brake means associated with said second ring gear, and clutch means between one pair of the connected elements of said planetary gear mechanisms and another element of one of said planetary gear mechanisms.

6. A transmission comprising a first planetary gear mechanism having a first sun gear, first planet pinion means, and a first ring gear, a second planetary gear mechanism having a second sun gear, second dual planet pinion means, and a second ring gear, said first and second planet pinion means being connected together, said first ring gear and said second sun gear being connected together, brake means associated with said first sun gear, brake means associated with said second ring gear, and clutch means between said first and second planet pinion means and second ring gear.

7. A transmission comprising a first planetary gear mechanism having a first sun gear, first planet pinion means, and a first ring gear, a second planetary gear mechanism having a second sun gear, second dual planet pinion means, and a second ring gear, said first and second planet pinion means being connected together, said first ring gear and said second sun gear being connected together, brake means associated with said first sun gear, brake means associated with said second ring gear, and clutch means between said first and second planet pinion means and said second sun gear.

8. A transmission comprising a first planetary gear mechanism having a first sun gear, first planet pinion means, and a first ring gear, a second planetary gear mechanism having a second sun gear, second dual planet pinion means, a second ring gear, said first and second planet pinion means being connected together, said first ring gear and said second sun gear being connected together, brake means associated with said first sun gear, brake means associated with said second ring gear and clutch means between said first and second planet pinion means and said first sun gear.

9. A transmission comprising a first planetary gear mechanism having a first sun gear, first planet pinion means, and a first ring gear, a second planetary gear mechanism having a second sun gear, second dual planet pinion means, and a second ring gear, said first and second planet pinion means being connected together, said first ring gear and said second sun gear being connected together, brake means associated with said first sun gear, and clutch means between said second sun gear and said second ring gear.

10. A transmission having drive and driven shafts comprising a first planetary gear mechanism having three first elements, namely, a first sun gear, first single planet pinion means, and a first ring gear, a second planetary gear mechanism having three second elements, namely, a second sun gear, a second dual planet pinion means and a second ring gear, said first and second planet pinion means being connected together, said first ring gear and said second sun gear being connected together, first brake means associated with said first sun gear, second brake means associated with said second ring gear, said first ring gear and said second sun gear having connection with said drive shaft, and said first and second planet pinion means having connection with said driven shaft.

11. A transmission having drive and driven shafts comprising a first planetary gear mechanism having a first sun gear, first planet pinion means, and a first ring gear, a second planetary gear mechanism having a second sun gear, second dual planet pinion means, and a second ring gear, said first and second planet pinion means being connected together, said first ring gear and said second sun gear being connected together, brake means associated with said first sun gear, brake means associated with said second ring gear, clutch means between said first and second planet pinion means and second ring gear, said first ring gear and said second sun gear having connection with said drive shaft, and said first and second planet pinion means having connection with said driven shaft.

12. A transmission having drive and driven shafts comprising a first planetary gear mechanism having a first sun gear, first planet pinion means, and a first ring gear, a second planetary gear mechanism having a second sun gear, a second dual planet pinion means, and a second ring gear, said first and second planet pinion means being connected together, said first ring gear and said second sun gear being connected together, brake means associated with said first sun gear, brake means associated with said second ring gear, clutch means between said first and second planet pinion means and said second sun gear, said first ring gear and said second sun gear having connection with said drive shaft, and said first and second planet pinion means having connection with said driven shaft.

13. A transmission having drive and driven shafts comprising a first planetary gear mechanism having a first sun gear, first planet pinion means, and a first ring gear, a second planetary gear mechanism having a second sun gear, second dual planet pinion means, a second ring gear, said first and second planet pinion means being connected together, said first ring gear and said second sun gear being connected together, brake means associated with said first sun gear, clutch means between said first and second planet pinion means and said first sun gear, said first ring gear and said second sun gear having connection with said drive shaft, and said first and second planet pinion means having connection with said driven shaft.

14. A transmission having drive and driven shafts comprising a first planetary gear mechanism having a first sun gear, first planet pinion means, and a first ring gear, a second planetary gear mechanism having a second sun gear, second dual planet pinion means, and a second ring gear, said first and second planet pinion means being connected together, said first ring gear and said second sun gear being connected together, brake means associated with said first sun gear, brake means associated with said second ring gear, clutch means between said second sun gear and said second ring gear, said first ring gear and said second sun gear having connection with said drive shaft, and said first and second planet pinion means having connection with said driven shaft.

15. The transmission of claim 11 characterized by the drive and driven shafts thereof being disposed coaxially of each other with the first and second planetary gear mechanisms arranged in juxtaposition of each other and coaxially of the common axis of said drive and driven shafts, and with the clutch means being disposed adjacent the second planetary gear mechanism.

16. The transmission of claim 12 characterized by the drive and driven shafts thereof being disposed coaxially of each other with the first and second planetary gear mechanisms arranged in spaced relation lengthwise of the common axis of said drive and driven shafts, and with the clutch means being disposed between the first and second planetary gear mechanisms.

17. The transmission of claim 14 characterized by the drive and driven shafts thereof being disposed coaxially of each other with the first and second planetary gear mechanisms arranged in juxtaposition of each other and coaxially of the common axis of said drive and driven shafts, and with the clutch means being dipsosed adjacent the second planetary gear mechanism.

HAROLD E. CHURCHILL.

REFERENCES CITED

The following references are of record in the file of this patent:

UNITED STATES PATENTS

| Number | Name | Date |
|---|---|---|
| 1,657,858 | Ford | Jan. 31, 1928 |
| 1,806,431 | Tuttle | May 19, 1931 |
| 2,127,655 | Stromquist | Aug. 23, 1938 |
| 2,193,304 | Thompson | Mar. 12, 1940 |